United States Patent Office 3,000,969
Patented Sept. 19, 1961

3,000,969
ALPHA,OMEGA-DIHALO-GEMINAL-DINITRO COMPOSITIONS
Levonna Herzog, Mountain View, N.J., assignor to Aerojet-General Corporation, Azusa, Calif., a corporation of Ohio
No Drawing. Filed Apr. 11, 1957, Ser. No. 652,307
6 Claims. (Cl. 260—644)

This invention relates to new compositions of matter and methods for producing the same and is related in particular to dihalo geminal dinitro aliphatic compositions having the general formula:

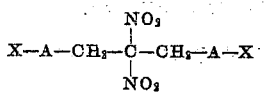

wherein A is a lower alkylene radical and X is a chlorine or bromine radical.

This application is a continuation-in-part of my copending application Serial No. 439,458, filed June 25, 1954, now abandoned, which was a continuation-in-part of application Serial No. 203,559, filed December 29, 1950, subsequently abandoned.

The dihalogen compounds of this invention are used as starting materials in the preparation of nitro-substituted diesters as disclosed in my copending application Serial No. 652,308, filed concurrently with the present application. The diesters thus obtained undergo ester interchange to form nitro diols and the resulting nitro diols readily react with diisocyanate compositions such as methylene diisocyanate to form nitro polyurethanes, as disclosed in assignee's copending application Serial No. 328,515, filed December 29, 1952, now abandoned. The nitro polyurethanes thus obtained are useful as a primary propulsion source in rocket-propelled vehicles, and can also be used as a propellant for artillery missiles. When used as the primary propulsion source for rocket vehicles, they can be conveniently ignited by a conventional igniter, as for example the igniter disclosed in assignee's copending United States patent application Serial No. 306,030, filed August 23, 1952. The propellant is preferably cast in tubular form and restricted in the conventional manner with a relatively inert resin, such as a non-nitrated polyurethane foam or a polyester resin, and placed inside a chamber having one end open and leading into a conventional venturi rocket nozzle. Upon ignition, large quantities of gases are produced and exhausted through the nozzle creating propulsive force.

The dihalogen compounds of this invention are conveniently prepared by the reaction of bromine or chlorine upon the corresponding di-silver dialkanoates in accordance with the general reaction scheme set forth below:

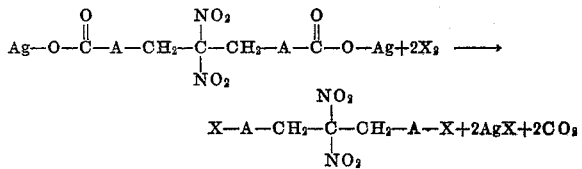

wherein A is a lower alkylene radical and X is bromine or chlorine.

The reaction temperature is non-critical in the practice of this invention, the only effect of temperature variation being a corresponding increase or decrease in reaction rate which in turn results in a corresponding increase or decrease in reaction time.

To more clearly illustrate my invention, the following example is provided. It should be understood that this example is presented purely for illustrative purposes and should not be construed as limiting the invention to the particular conditions set forth therein.

EXAMPLE

*Preparation of 3,3-dinitro-1,5-pentanedibromide*

A three-necked flask, fitted with a mercury sealed stirrer, thermometer, and condenser, having a calcium chloride drying tube and a dropping funnel connected thereto, is charged with 132 ml. (412 gms.; 2.57 moles) of dry bromine and 600 ml. of carbon tetrachloride. A dispersion of 550 grams (1.10 moles) of the dried silver salt of 4.4-dinitro-1,7-heptanedioic acid in 4000 ml. of carbon tetrachloride is slowly added to the bromine solution with stirring. The reaction mixture is held at between 50 and 60° C. After the reaction is complete the carbon tetrachloride solution is filtered from the silver bromide solution and the silver bromide is washed with more carbon tetrachloride which is added to the main filtrate. The carbon tetrachloride solution is washed with an aqueous sodium bisulfite solution until free of bromine, washed with sodium bicarbonate until it is neutral, with dilute acid until the solution is just acid and washed with water until neutral. The carbon tetrachloride is evaporated from the mixture and the residue is distilled at a temperature varying between 110 and 122° C. and under a pressure of 1-2 mm. This yields 3,3-dinitro-1,5-pentane dibromide which has a refractive index of $n_D^{25}$ 1.5348. When this material is redistilled the refractive index is $n_D^{25}$ 1.5354.

This compound, having the formula $C_5H_8N_2O_4Br_2$ has a calculated composition of: Percent C, 18.77; percent H, 2.52; percent N, 8.76; percent Br, 49.95, by weight. The results obtained by ultimate analysis are: Percent C, 19.81; percent H, 2.64; percent N, 8.17; percent Br, 49.37, by weight.

Homologues of these compounds are prepared simply by reacting the corresponding silver salt in the manner described in Example I.

The starting materials used in this invention are obtained by reacting the corresponding ammonium salt with silver nitrate to form the insoluble silver salt. The ammonium salts are obtained by reacting the corresponding diacids with ammonia. The diacids are prepared by the method disclosed in assignee's copending application No. 198,491, filed November 30, 1950, Patent No. 2,918,489, issued December 22, 1959.

I claim:

1. As compositions of matter, the dihalo-nitroalkanes having the formula:

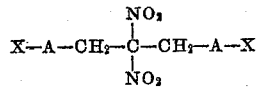

wherein A is a lower alkylene radical and X is a halogen radical selected from the group consisting of bromine and chlorine.

2. As compositions of matter, the dibromo-nitroalkanes having the formula:

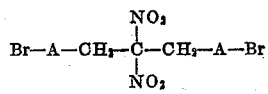

wherein A is a lower alkylene radical.

3. As a composition of matter, 3,3-dinitro-1,5-pentanedibromide, having the structural formula:

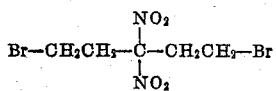

4. The method of preparing a dihalo-nitroalkane which comprises reacting a halogen selected from the group consisting of chlorine and bromine with a silver nitroalkanoate having the formula:

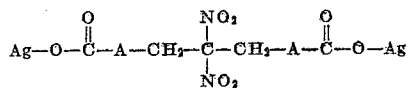

wherein A is a lower alkylene radical.

5. The method of preparing a dibromo-nitroalkane which comprises reacting bromine with a silver nitroalkanoate having the formula:

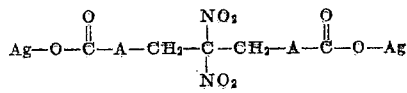

wherein A is a lower alkylene radical.

6. The method of preparing 3,3-dinitro-1,5-pentane-dibromide which comprises reacting bromine and di-silver 4,4-dinitro-1,7-heptanedioate.

References Cited in the file of this patent

UNITED STATES PATENTS

| | | |
|---|---|---|
| 2,289,546 | Lecher et al. | July 14, 1942 |
| 2,309,806 | Tindall | Feb. 2, 1943 |
| 2,337,912 | McBee et al. | Dec. 28, 1943 |

OTHER REFERENCES

Royals: "Advanced Organic Chemistry," pages 56–58 (1956), Prentice-Hall, Inc., N.J.

Ostromisslensky: "J. Prakt. Chem." 84, 489 (1911).

Schmidt et al.: "Ber." 59B, 1876–88 (1926).

Macbeth et al.: "Jour. Chem. Soc." 1932, 534–43.

Downing et al.: "Jour. Chem. Soc." 1934, 1671–72.

Hass et al.: "Chem. Rev." 32, 421, 425, 427 (June 1943).

Hurd et al.: "J.A.C.S." 55, 699–702 (1933).